Dec. 26, 1961  L. GUSTAD, JR., ET AL  3,014,260
HOLE PUNCHING MACHINE
Filed March 27, 1959  3 Sheets-Sheet 1

INVENTORS
Louis Gustad, Jr.,
Harry A. Hughes and
Willard A. Gillon
BY
Teare, Kramer, Sturges & Fetzer
ATTORNEYS Dec. 26, 1961    L. GUSTAD, JR., ET AL    3,014,260
HOLE PUNCHING MACHINE Filed March 27, 1959                          3 Sheets-Sheet 2

INVENTORS
Louis Gustad, Jr.,
Harry A. Hughes and
Willard A. Gillon
BY Teare, Kramer, Sturges & Fetzer
ATTORNEYS Dec. 26, 1961 L. GUSTAD, JR., ET AL 3,014,260
HOLE PUNCHING MACHINE
Filed March 27, 1959 3 Sheets-Sheet 3
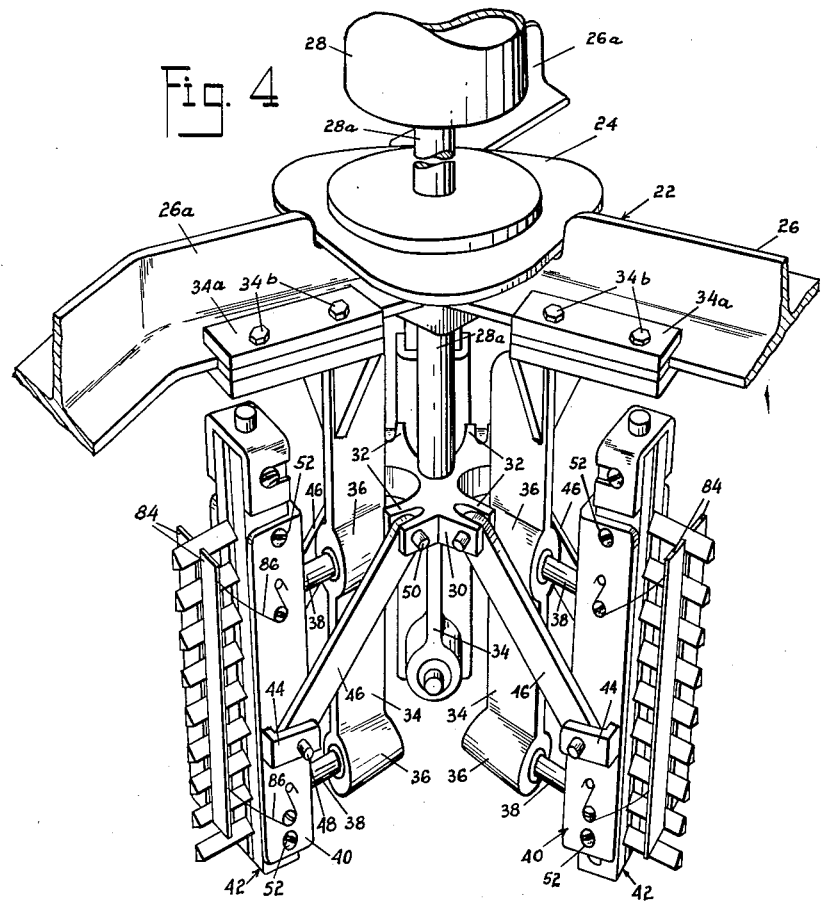
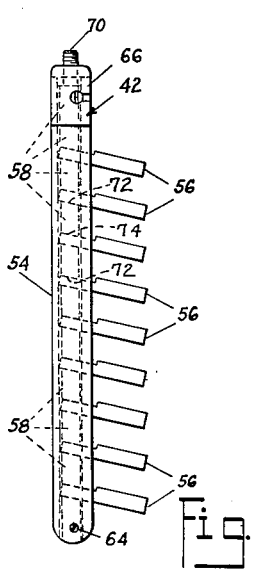
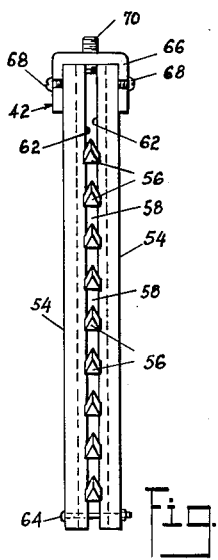
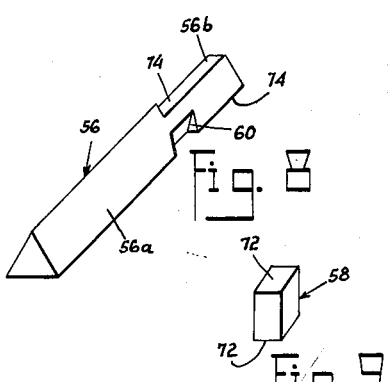
INVENTORS
LOUIS GUSTAD, JR.,
HARRY A. HUGHES AND
WILLARD A. GILLON
BY
Teare, Kramer, Sharpes & Felper
ATTORNEYS

United States Patent Office 3,014,260
Patented Dec. 26, 1961

3,014,260
HOLE PUNCHING MACHINE
Louis Gustad, Jr., Westerville, and Harry A. Hughes and Willard A. Gillon, Sr., Crooksville, Ohio, assignors to Ferro Corporation, Cleveland, Ohio, a corporation of Ohio
Filed Mar. 27, 1959, Ser. No. 802,495
5 Claims. (Cl. 25—105)

This invention relates to a hole forming mechanism, and more particularly to a hole punching machine adapted for use in the manufacture of clay refractories, such as saggers.

Saggers are commonly used by manufacturers of ceramic products for holding a plurality of articles, such as dinnerware items, during the firing process for such items. Such saggers conventionally comprise a plurality of rows of generally vertically aligned recesses or openings in the inner surfaces thereof, for receiving pin-like elements on which ceramic ware is supported in the sagger during the firing process. Such saggers are formed from various clay compositions and in pin receiving openings are generally formed in the saggers in the wet or green condition of the latter. In the past, arrangements for the production of such holes in the sagger walls have been inefficient, complicated, or inaccurate, and have left much to be desired.

The present invention provides a pinhole producing machine particularly adapted for use in the production of the aforementioned refractory items, such as saggers, which will produce the desired holes or openings in the inner surfaces of a sagger, and in a rapid and efficient manner. The invention also provides a pinhole producing mechanism which is readily adjustable so that it may be used to produce pin receiving openings in various sizes of saggers, thus resulting in a machine having maximum adaptability in the ceramic product industry.

Accordingly, an object of the invention is to provide an effective pinhole producing mechanism for use in the production of various types of refractory items.

Another object of the invention is to provide a mechanism of the latter type which is adapted for efficient use in the production of different sizes of refractory items.

A further object of the invention is to provide a pinhole punching mechanism actuated by powered motor means for rapidly and effectively producing pin receiving holes in a green refractory article, such as a sagger.

A further object of the invention is to provide a pinhole producing machine particularly adapted for use in the manufacture of saggers which is uncomplicated in design, effective and rapid in operation, and which possess a high degree of accuracy in the production of pin receiving recesses in the sagger.

In the drawings:

FIG. 4 is an enlarged, perspective view of a sub-assembly of the punching mechanism illustrating the structural unit which provides for movement of the punch elements towards and away from the inner surfaces of a sagger for producing pin receiving openings therein.

FIG. 6 is an enlarged, side elevational view of one of the punch head assemblies, including the punch elements proper, in final assembled position.

FIG. 7 is a front elevational view of the assembly shown in FIG. 6.

FIG. 8 is an enlarged, perspective view of one of the punch elements of the mechanism.

FIG. 9 is an enlarged, perspective view of one of the spacer block elements of a punch head assembly for properly spacing the punch elements in vertical relation when in assembled position in a punch head.

Figure 3:
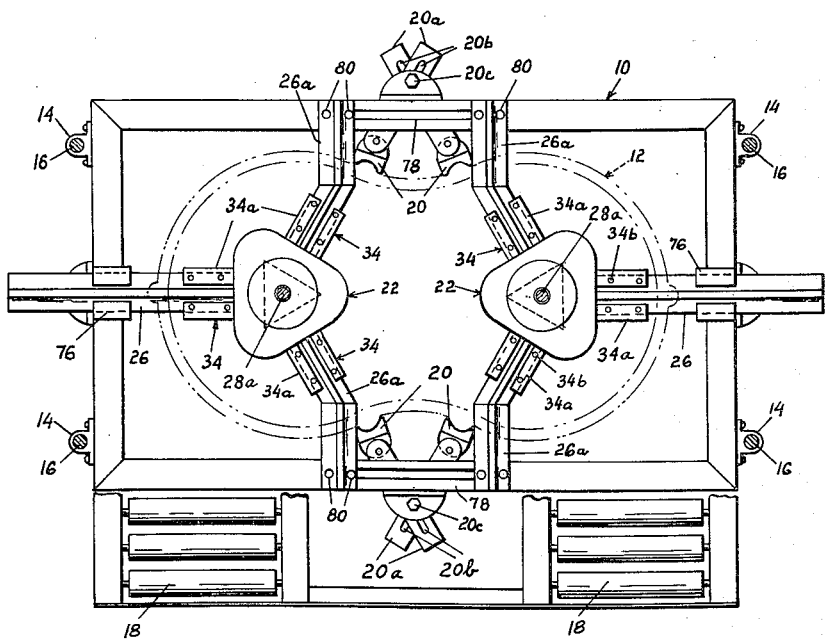
FIG. 3 is a top plan view of the machanism of FIG. 1, with the fluid powered cylinder units which actuate the mechanism having been removed, in the interests of clarity.

Referring again to the drawings, the punching mechanism is shown as comprising a main frame 10 of generally rectangular configuration for receiving therein an open top sagger 12, shown in phantom lines in FIG. 3. In the embodiment shown, frame 10 is slidably mounted by means of guide elements 14 for movement in a generally vertical direction on columns 16 disposed at the corners of frame 10. The frame 10 may be moved vertically on columns 16 by any suitable means, such as hydraulic or air actuated cylinder units, or the like, not shown here. Preferably, the punching mechanism is provided with associated conveyor means 18 for facilitating movement of a sagger into underlying relation with respect to frame 10, after which the latter may be lowered into encircling relationship with the sagger.

Figure 1:
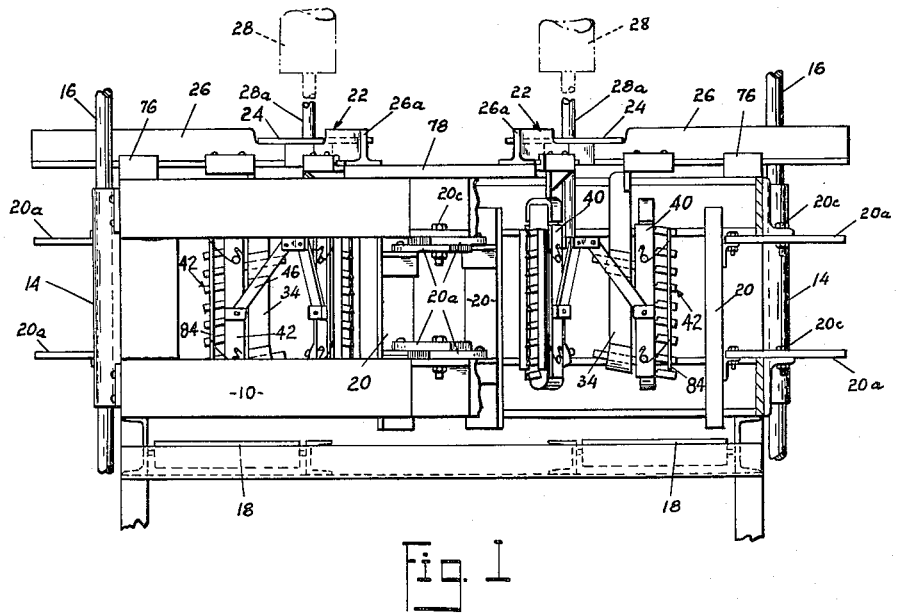
FIG. 1 is a partially broken, front elevation of the hole punching machine showing the general arrangement of the parts with the punch elements in retracted position.
Figure 2:
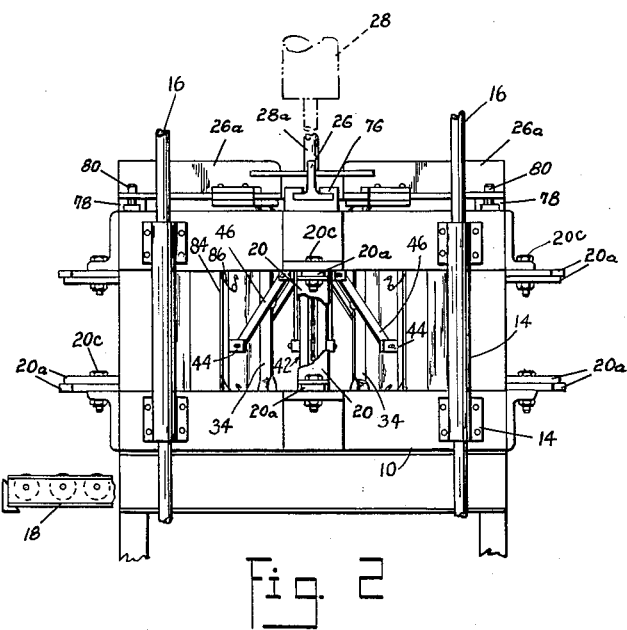
FIG. 2 is a side elevation of the machanism of FIG. 1.

Frame 10 also preferably comprises generally vertically extending back-up elements 20 (FIGS. 1, 2 and 3) and associated linkages 20a, which include elongated slots 20b (FIG. 3) and bolt and nut assemblies 20c, for adjusting the position of the back-up elements to accommodate various sizes of saggers. Back-up elements 20 are adapted to engage the outer sides of the sagger walls in the areas in which the hole punching operations on the sagger are performed.

Number 22 (FIGS. 3 and 4) designates a sub-assembly which supports the punch elements in operative position on framework 10. In the embodiment of the invention illustrated a pair of sub-assemblies 22 are mounted on frame 10 for the forming of a predetermined arrangement of pin receiving holes in a double pocket banjo type sagger. It will be understood that only a single sub-assembly unit could be utilized in connection with a single pocket sagger. Since each of the pair of sub-assembly units 22 are identical in construction, only one will be described here in detail.

Figure 5:
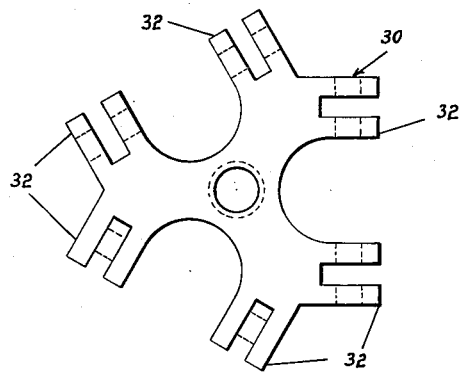
FIG. 5 is an enlarged, top plan view of an adaptor element of the machanism which is attached to the outer end of a piston rod of each of the reciprocal power units, for providing means for linking the punch head assemblies of the mechanism to such piston rod.

Each sub-assembly 22 comprises a body portion 24 with arm portions 26 and 26a projecting generally horizontally therefrom. Arm portions 26, 26a, in the embodiment illustrated, are of generally inverted T-shaped configuration in vertical cross section. A double acting, fluid powered, reciprocal motor unit 28 controlled by conventional valve means is suspended by any suitable means above the body portion 24, and the piston rod element 28a thereof extends vertically through the body portion 24 in movable relation therewith. An adaptor element 30 (FIGS. 4 and 5) is fastened to the end of rod 28a for operatively connecting the motor unit 28 with the punch head assemblies, and the adaptor 30 comprises pairs of clevis portions 32 for linking the piston rod to the punch head assemblies, as will be hereinafter described.

Depending from each of aforementioned arm portions 26, 26a is a guide rod holder element 34. Each guide rod holder element 34 is slidably mounted with respect to the associated arm portion by means of slide portions 34a (FIGS. 3 and 4). Bolt elements 34b are provided on slide portions 34a for locking the guide rod holder elements 34 in predetermined position with respect to the arm portions 26, 26a. Each holder element comprises vertically spaced bearing portions 36 (FIG. 4) which receive therein a guide rod element 38 in slidable relation.

The rod elements 38 of each holder 34 are attached at their outer ends to a generally U-shaped, in horizontal cross section, punch head holder or housing member 40.

Each housing member 40 is adapted to detachably mount a punch head assembly unit 42 (FIGS. 6 and 7) therein, as will be hereinafter described in greater detail. Each housing element 40 comprises a bracket 44 (FIG. 4) secured to each side thereof, and a link element 46 is pivotally connected at one end, as at 48, to an associated bracket 44, and at the other end is pivotally connected as at 50, to one of the aforementioned clevis portions 32 of adaptor element 30 secured to piston rod 28a. Holder elements 34 are so positioned outwardly with respect to the pivotal connections 50 of links 46 to adaptor element 30 on rod 28a that connections 50 are always disposed inwardly of the pivotal connections 48 of the links to housing members 40, in any position of the path of movement of rod 28a, thereby preventing the housing members 40 and associated linkages 46 from becoming locked in inoperative relation upon maximum upward movement of the piston rod 28a with respect to its associated cylinder. In the maximum retracted position of rod 28a, the links 46 are disposed in a generally vertical position, and upon outward or downward movement of the rod 28a, the links 46 are moved toward a generally horizontal position, the latter arrangement providing for a highly compact punching mechanism. Thus it will be seen that upon downward movement of rod 28a of motor unit 28, the housing members 40 and associated punch head assemblies 42 are simultaneously moved generally radially outwardly with respect to the piston rod 28a and the depending holder elements 34, and with the housing members 40 being supported for such movement by the reciprocal rod elements 38 movably mounted in bearing portions 36 on holder elements 34. Rod elements 38 are of sufficient length to prevent their disengagement from the associated holder element 34 upon the full outward stroke of rod 28a.

Each punch head assembly 42 is detachably secured to its associated housing member 40 by means of set screws 52 (FIG. 4) threaded through the side walls of housing members 40. It will be seen therefore that only the housing members 40 are positively secured to the reciprocal motor unit 28, with the punch head assemblies 42 being easily detachable from the housing members, thus providing for rapid and quick changeability of the punch head assemblies, and thereby resulting in expeditious means for the provision of a wide range of hole patterns for different sizes and types of saggers.

Each punch head assembly 42 comprises a pair of generally confronting, elongated plate elements 54 (FIGS. 6 and 7) with the latter being of generally U-shaped configuration in horizontal cross section. A vertical row of punch elements 56 (FIG. 8) are held between the plate elements 54, and spacer blocks 58 (FIG. 9) are located between each punch element, to space the latter a predetermined distance from the adjacent punch elements.

Each punch element 56 comprises, in the embodiment illustrated, a triangular shaped head portion 56a which is adapted to extend forwardly of the retainer plates 54, and a body portion 56b which is adapted to be received between such plate members. Body portion 56b at its forward end has slots 60 (FIG. 8) formed in opposite sides thereof for receiving the front flanges 62 of plate members 54, and thus prevent unintentional withdrawal of the punch elements 56 from assembly between the plate elements 54. The plate elements 54 of each punch head assembly 42 are secured together at their lower ends by fastening means 64, such as a cap screw, and their upper ends are secured together by a U-shaped cap element 66, which is detachably connected to the plate elements by means of suitable fasteners 68. A set screw member 70 is threaded through cap 66 for tightening the punch elements 56 and associated spacer blocks 58, into a generally rigid assembly. The spacer blocks 58 have forwardly and downwardly sloping or oblique top and bottom surfaces 72 thereon for flat surface-to-surface engagement with flat surfaces 74 on the top and bottom of each punch element 56, thereby positioning the punch elements to slant in a generally forwardly and downwardly direction when such punch elements are in assembled relation with the spacer blocks in a punch head assembly. It will also be noted that the bearing portions 36 on holder elements 34, and associated rod elements 38 connected to housing members 40, also slope downwardly in a forward direction complementally to the slope of the punch elements 56 (FIG. 4), to thus facilitate the production of properly formed, clean cut pin hole openings in the sagger walls.

Each of the aforementioned punch sub-assembly units 22 is also preferably adjustable lengthwise of supporting framework 10 to facilitate the accommodation of various sizes of saggers for punching operations thereon. In this connection, a guide bracket 76 (FIGS. 2 and 3) is located on the top surface of each end of framework 10 for receiving therein in slidable relation associated arm element 26 of each sub-assembly unit 22, and guide brackets 78 (FIGS. 2 and 3) are located on the top surface of each side of framework 10 for supporting the associated arm portions 26a thereon in adjustable relation. Bolt and nut locking assemblies 80 are provided adjacent the outer ends of arms 26a, for guiding and locking the sub-assembly unit 22 in predetermined lengthwise position with respect to framework 10. It will be seen therefore that the adjustability of sub-assembly units 22 with respect to framework 10 by means of the latter discussed coacting arms 26, 26a and bracket structure 76, 78, in combination with the adjustability of the depending holder elements 34 with respect to arm portions 26 and 26a by means of slide portions 34a, provides a punching machine which can be utilized with a wide range of ceramic refractories or saggers for producing pin receiving openings therein. It will also be seen that the quick interchangeability of the punch head assembly units 42 into and from associated housing members 40 provides an arrangement wherein the spacing between the individual punch elements 56 can be quickly and readily varied over a wide range by changing the size of the spacer blocks 58, or by substituting a new punch head assembly with different punch element spacing, thereby greatly increasing the usability of the apparatus in the refractory specialties industry.

In order to facilitate the production of cleanly punched and properly formed holes in the inner surfaces of a green sagger and without deformation of the adjacent walls of the sagger, elongated bearing plate elements 84 (FIG. 4) are preferably provided on each side of each vertical row of punch elements in punch head assemblies 42. These bearing plates are resiliently mounted on housing members 40 by means of generally upwardly extending finger springs 86. It will be seen therefore that as the punch elements 56 cut into the confronting inner side of the sagger member being punched, the bearing plates 84 will engage the saggers surface on opposite sides of the punch elements and will be moved generally rearwardly against the resistance of finger springs 86. Thereafter, as the punch elements are being withdrawn from the formed openings in the sagger walls during inward movement of the punch head assemblies 42 and their associated housing members 40, the finger springs 86 will maintain the bearing plates 84 in contact with the sagger walls until substantially complete withdrawal of the punch elements from contact with the sagger, to thereby aid in preventing deformation of the sagger walls and produce more perfectly formed holes in the latter during the punching operation.

From the foregoing discussion and accompanying drawings it will be seen that the invention provides a punching mechanism which will quickly and effectively form pin receiving openings in the inner surfaces of refractory items, such as saggers, and which is adjustable so as to be readily usable with a wide range of sagger sizes, thereby providing a punching mechanism having maximum usability in the refractory specialties field.

The terms and expressions which have been employed are used as terms of description and not of limitation and there is no intention in the use of such terms and expressions of excluding any equivalents of any of the features described or shown, or portions thereof, but it is recognized that various modifications are possible within the scope of the invention claimed.

We claim:

1. A machine for providing vertical rows of pin receiving holes in the inner surface of a green refractory item such as a sagger and the like, said machine comprising a frame adapted to receive a sagger therein to be punched, punching mechanism mounted on said frame and extending generally vertically into the latter, said mechanism comprising a plurality of generally horizontally extending arm portions supporting said punching mechanism on said frame, said arm portions being adjustably mounted on said frame for generally horizontal movement of said punching mechanism with respect to said frame, a reciprocal type motor unit including a piston rod mounted for generally vertical movement with respect to said arm portions, generally vertically extending holder elements mounted on said arm portions, means supporting said holder elements for horizontal movement on said arm portions, means coacting therebetween to lock said holder elements in predetermined position with respect to said arm elements, housing elements mounted on said holder elements for reciprocal movement in a generally horizontal direction with respect to said holder elements, lever means operably coupling said housing elements to said rod of said power unit and coacting therebetween to reciprocate said housing elements in a generally horizontal direction, a punch head assembly mounted in each of said housing elements, each punch head assembly including a plurality of vertically spaced punch elements detachably supported in each of said punch head assemblies, and means for detachably locking each punch head assembly to an associated housing element.

2. In a punching machine in accordance with claim 1 wherein said housing elements are mounted on said holder elements by means of slide rod members secured to said housing elements and slidable in bearing portions on said holder elements, said bearing portions and associated slide rod elements being tilted downwardly in an outward direction with respect to the horizontal.

3. In a punching machine in accordance with claim 1 wherein said lever means includes linkages pivotally connected to said housing elements and to said piston rod, said linkages being disposed generally vertically when said punch head assemblies and associated housing elements are in fully retracted position and generally horizontally when said punch head assemblies and associated housing elements are in fully extended position, the pivotal connections of said linkages to said housing elements being disposed outwardly of the pivotal connections of said linkages to said piston rod when said housing elements and associated punch head assemblies are in fully retracted position.

4. In a punching machine in accordance with claim 1, including means adjustably mounted on said frame and adapted to engage in abutting relation with confronting portions of the outer side surfaces of an associated sagger for backing up the sagger in the vicinity of said punch elements.

5. In a punching machine in accordance with claim 2 wherein said punch elements are maintained in vertically spaced relation by means of intermediate spacer block members, said spacer block members having oblique top and bottom surfaces for slanting said punch elements generally complementally to the tilt of said bearing portions and associated slide rod elements.

References Cited in the file of this patent

UNITED STATES PATENTS

| | | |
|---|---|---|
| 1,677,677 | Irwin | July 17, 1928 |
| 2,680,276 | Filangeri | June 8, 1954 |
| 2,827,683 | Benant et al. | Mar. 25, 1958 |